April 18, 1939. H. E. MORTON 2,154,576
KEYWAY CUTTING TOOL
Filed Feb. 24, 1938
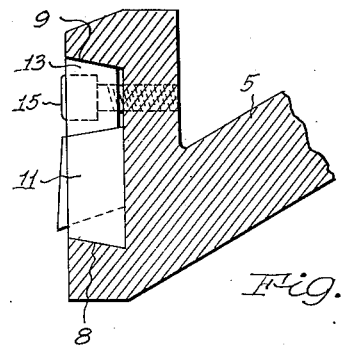
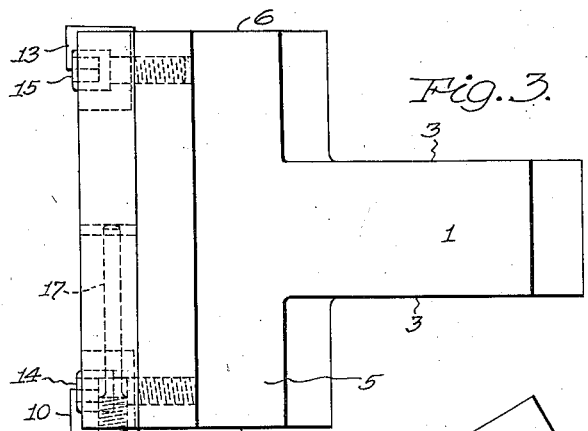
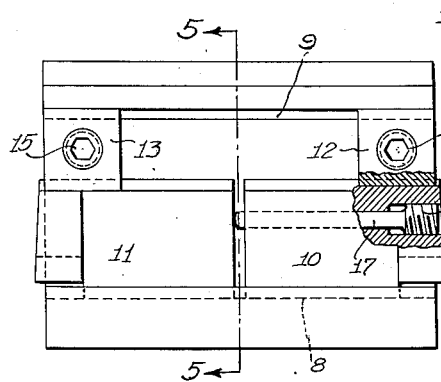
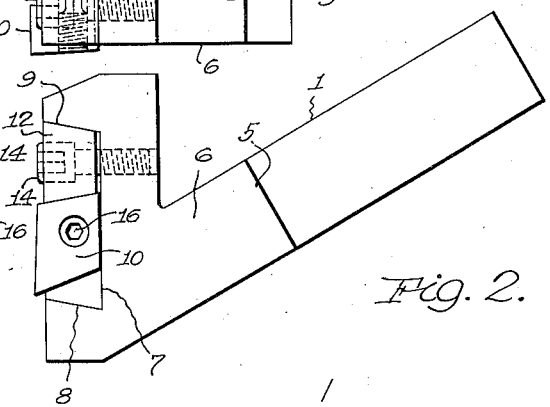
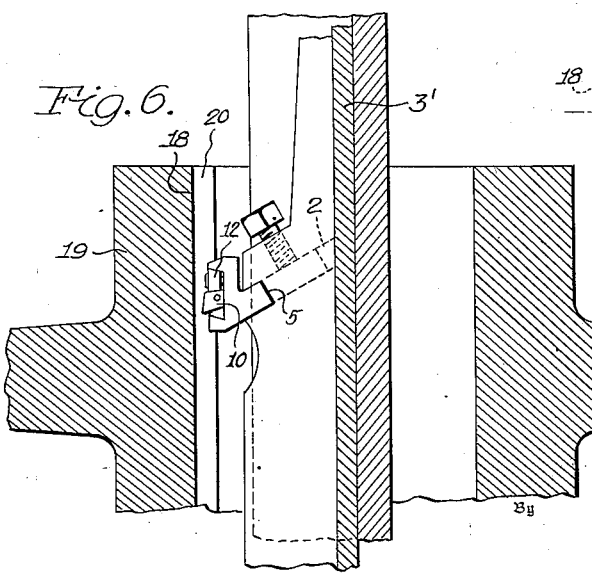
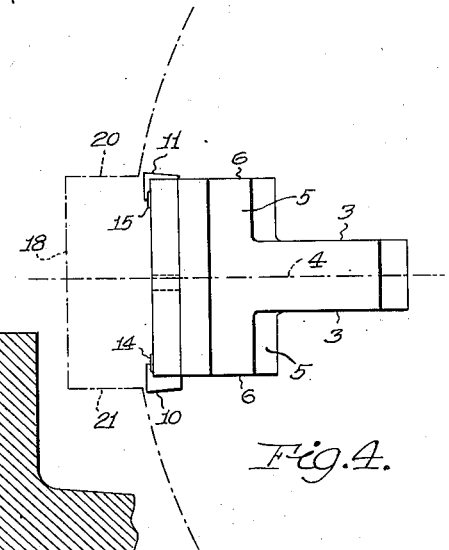
Inventor
Henry Earl Morton
By
Attorneys Patented Apr. 18, 1939

2,154,576

UNITED STATES PATENT OFFICE 2,154,576

KEYWAY CUTTING TOOL

Henry Earl Morton, Muskegon Heights, Mich.

Application February 24, 1938, Serial No. 192,336

8 Claims. (Cl. 90—25)

This invention relates to a cutting tool especially designed for use in forming channels or keyways of extended length in the wall of a bore in a work piece, and more particularly for use in forming and dressing the side walls of preformed channels or keyways.

An object of the invention is to provide a device for this purpose adapted for attachment to a member for reciprocating the same, and embodying laterally projecting cutting instrumentalities adapted to dress the side walls of a preformed channel or keyway, by a draw cut operation.

Another object of the invention is to provide a cutting tool of the character above referred to wherein the cutting instrumentalities may be adjusted laterally of the device. The device which supports the cutting instrumentalities is adapted to be mounted in a reciprocating member whose path of movement has a definite relationship with the bore in the work, and the cutting instrumentalities are adjusted with respect to reference surfaces on the device whereby the position or size of the channel or keyway may be varied at will. That is, for example, the parallel sides of the channel or keyway might reside parallel to a reference line extending radially with respect to the bore, but with such walls spaced unequal distances from said radial line.

Another object of the invention is to provide a device of the character above mentioned embodying means for clamping the laterally projecting cutting instrumentalities in accurately adjusted positions, said means being such as to facilitate assembly and adjustment of the cutting instrumentalities.

With the above and other ends in view the invention is more fully disclosed with reference to the accompanying drawing, in which—

Figure 1 is a front elevation partly broken away and in section;

Fig. 2 is a side elevation;

Fig. 3 is a top plan view;

Fig. 4 is a diagram showing the cutting device in plan;

Fig. 5 is a section taken on the line 5—5 of Fig. 1, and

Fig. 6 is a vertical section illustrating the cutting device assembled in the reciprocating member.

Like characters of reference are employed throughout to designate corresponding parts.

The present tool support embodies a shank 1 adapted to be inserted in the slot 2 of a reciprocating member 3', said reciprocating member being of the type already known and used in conjunction with keyway cutting and slotting machines. The side walls 3 of the shank are accurately spaced an equal distance on opposite sides of the center line 4 of the shank, and the head 5 has end walls 6 respectively spaced an equal distance on opposite sides of the center line 4. Therefore when the shank 1 is inserted in the slot 2 of the reciprocating member the surfaces 6 have a definite relationship with the path of movement of the reciprocating member and may therefore be used as reference surfaces for the purpose of positioning the cutting instrumentalities laterally.

The front face of the head 5 is formed with a transversely extending groove 7 having an undercut lower side wall 8 and an oblique upper side wall 9. Cutting instrumentalities 10 and 11 of dove-tailed section are slidably mounted in the groove 7 and are clamped therein respectively by wedge-shaped clamping blocks 12 and 13. The clamping blocks 12 and 13 cooperate with one of the dove-tailed walls of respective cutting instrumentalities 12 and 13 and with the oblique upper side wall 9 of the groove 7 and may be manually tightened into wedging engagement with their respective cutting instrumentalities of screws 14 and 15 respectively.

The two cutting instrumentalities are thus supported whereby they may be moved in a plane extending laterally with respect to the center line 4, and inasmuch as the surfaces 6 have a definite relationship with respect to the center line 4, said surfaces 6 constitute reference planes and the adjustment of the cutting instrumentalities may be measured by using said reference surfaces as the base from which the measurements are taken.

The cutting instrumentalities may be moved inwardly of the head 5 quite readily by exerting manual pressure thereagainst, but in order to move them outwardly of the head to positions having definite relationship with reference planes 6, the invention provides a set screw 16. The set screw 16 is mounted in the cutting instrumentality 10 and has an elongate stem 17 extending through the cutting instrumentality 10 and engaging the cutting instrumentality 11. If the cutting instrumentality 10 is to be moved outwardly the clamping element 12 is loosened while the clamping element 13 remains tightened, and when the set screw 16 is rotated in the proper direction the stem 17 acts against the cutting instrumentality 11 and pushes the cutting instrumentality 10 outwardly. If the cutting instrumentality 11 is to be moved outwardly, the clamping element 13 is loosened while the clamping element 12 remains tightened, and upon proper rotation of the set screw 16 the stem 17 pushes the cutting instrumentality 11 outwardly.

It becomes apparent from the foregoing that the two cutting instrumentalities are individually adjustable with the result that they may be spaced at unequal distances from the center line of the head as shown in Fig. 4. With such an arrangement the channel or keyway 18 which is cut in the work 19 may have one of its side walls 20, for example, spaced a shorter distance from the center line 4 than the side wall 21.

What I claim is:

1. A tool holder adapted to be mounted in a reciprocable element, said holder comprising a head having a slot opening through side walls thereof, cutting instrumentalities mounted in said slot with their cutting edges projecting laterally from said head, individual means for clamping said cutting instrumentalities against movement, and adjusting means carried by one of said cutting instrumentalities and adapted to be actuated to exert a force tending to move said instrumentalities in opposite directions, whereby upon release of one clamping means the cutting instrumentality released is moved by actuation of said adjusting means.

2. A tool holder adapted to be mounted in a reciprocable element, said holder including a head having a transverse slot with an undercut side wall and an oblique side wall, cutting instrumentalities of dove-tailed section mounted in said slot, wedge-shaped clamping elements contacting with one dove-tail side of said respective cutting instrumentalities and with said oblique side wall of said slot, and means for tightening said wedge-shaped clamping elements.

3. A tool holder adapted to be mounted in a reciprocating element, said holder having a transverse slot with an undercut side wall and an oblique side wall, cutting instrumentalities of dove-tailed section mounted in said slot, wedge-shaped clamping elements contacting with one dove-tail side of respective cutting instrumentalities and with said oblique side wall, means for tightening said wedge-shaped clamping elements, and means for moving said cutting instrumentalities individually.

4. A tool holder adapted to be mounted in a reciprocating element, said holder having a transverse slot with an undercut side wall and an oblique side wall, cutting instrumentalities of dove-tailed section mounted in said slot, wedge-shaped clamping elements contacting with one dove-tail side of respective cutting instrumentalities and with said oblique side wall, means for tightening said wedge-shaped clamping elements, and means adapted to be actuated to exert a force tending to move said cutting instrumentalities apart.

5. A tool holder adapted to be mounted in a reciprocating element, said holder having a transverse slot with an undercut side wall and an oblique side wall, cutting instrumentalities of dove-tailed section mounted in said slot, wedge-shaped clamping elements contacting with one dove-tailed side of respective cutting instrumentalities and with said oblique side wall, means for tightening said wedge-shaped clamping elements, and a set screw mounted in one cutting instrumentality and engaging the other instrumentality.

6. A tool holder comprising a head and a shank, said head having a groove opening through the face of said head and at its ends through the side walls of said head, cutters slidably mounted in said groove with their cutting edges projecting from the ends of said groove, and means for releasably securing said cutters in position within said groove with their cutting edges projecting beyond said side walls, said outer side surfaces of said walls being each spaced an equal distance from the longitudinal center line of said shank whereby the position of said cutting edges relative to the center of said shank and head may be measured by reference to said side surfaces, and means for adjusting each cutter relative to the other when one of said cutters is released by said securing means.

7. A tool holder comprising a head and a shank, a groove in the face of said head and opening at its ends through the side walls of said head, cutters slidably mounted in said groove in opposed relation with their cutting edges projecting from the ends of said groove, wedge means for releasably securing said cutters in position within said groove, the side surfaces of said head being spaced an equal distance on opposite sides of the center line of said head and shank whereby the position of said cutting edges relative to the center of said head may be measured by reference to said side surfaces, and means carried by one of said cutters to engage the other cutter and move the cutters relatively when one is released by said wedge means.

8. A tool holder for holding cutting tools adapted to reform the side walls of a keyway formed in the wall of a bore of the work, said holder having a head and a shank, said shank being adapted to be mounted in an opening in a reciprocable member adapted to be reciprocated within said bore, said head being formed with a transverse slot, said slot extending transversely of the longitudinal center line of said shank with said slot opening through the face of said head and through the side faces of said head, cutters mounted in said slot of said head in opposed relation with their cutting edges projecting from the ends of said slot, the side surfaces of said head through which said slot opens at its ends, providing reference surfaces from which to measure the distances to which the cutting edges of said cutting tools are positioned from the longitudinal center line of said shank, means for securing said cutting tools in position within said slot of said head, and means for separately adjusting each cutting tool longitudinally of said slot.

HENRY EARL MORTON.